United States Patent

Nixon et al.

[11] Patent Number: 5,886,289
[45] Date of Patent: Mar. 23, 1999

[54] LONG RANGE ARTILLERY SHELL

[75] Inventors: Robert J. Nixon, Chatham, United Kingdom; Martin J. Lewin, London, England; Terence L. Spellward, Sevenoaks, United Kingdom

[73] Assignee: The Secretary of State for Defence in Her Britannic Majesty's Government of the United Kingdom of Great Britain and Northern Ireland, Farnborough Hants, United Kingdom

[21] Appl. No.: 94,996

[22] Filed: Jul. 16, 1993

[30] Foreign Application Priority Data

Jul. 31, 1992 [GB] United Kingdom ............... 9216295

[51] Int. Cl.⁶ .......................... F42B 12/20; F42B 12/58; F42B 15/10
[52] U.S. Cl. ........................ 102/490; 102/489; 102/374
[58] Field of Search ............................. 102/490, 483, 102/374, 376, 377, 378, 379, 380, 381

[56] References Cited

U.S. PATENT DOCUMENTS

| | | | |
|---|---|---|---|
| H203 | 2/1987 | Thomas et al. ................ | 102/374 |
| 3,628,457 | 12/1971 | Magnusson et al. ............ | 102/374 |
| 4,554,872 | 11/1985 | Schleicher .................... | 102/490 |
| 4,574,700 | 3/1986 | Lewis ......................... | 102/374 |
| 4,754,704 | 7/1988 | Lübbers ....................... | 102/490 |
| 4,807,532 | 2/1989 | Andersson et al. ............ | 102/490 |
| 4,807,535 | 2/1989 | Schilling et al. ............. | 102/374 |
| 4,846,071 | 7/1989 | Franzén et al. ............... | 102/490 |
| 4,930,420 | 6/1990 | Meffert et al. ............... | 102/490 |

FOREIGN PATENT DOCUMENTS 0 178 959 4/1986 European Pat. Off. .

*Primary Examiner*—Charles T. Jordan
*Assistant Examiner*—Theresa M. Wesson
*Attorney, Agent, or Firm*—Nixon & Vanderhye PC

[57] ABSTRACT

A long range artillery shell (1) comprising rocket propellant material (10), a rocket motor nozzle (14) and base bleed propellant material (12). Ignition of the rocket propellant material (10) is delayed until the base bleed propellant material (12) has substantially finished burning. The base bleed propellant material (12) may be housed in the same chamber and behind the rocket propellant material (10) in order to provide support to the rocket propellant material (10) during launch. The two propellant materials (10, 12) may be separated by a thermal ignition barrier (18) to prevent premature rocket ignition.

17 Claims, 2 Drawing Sheets

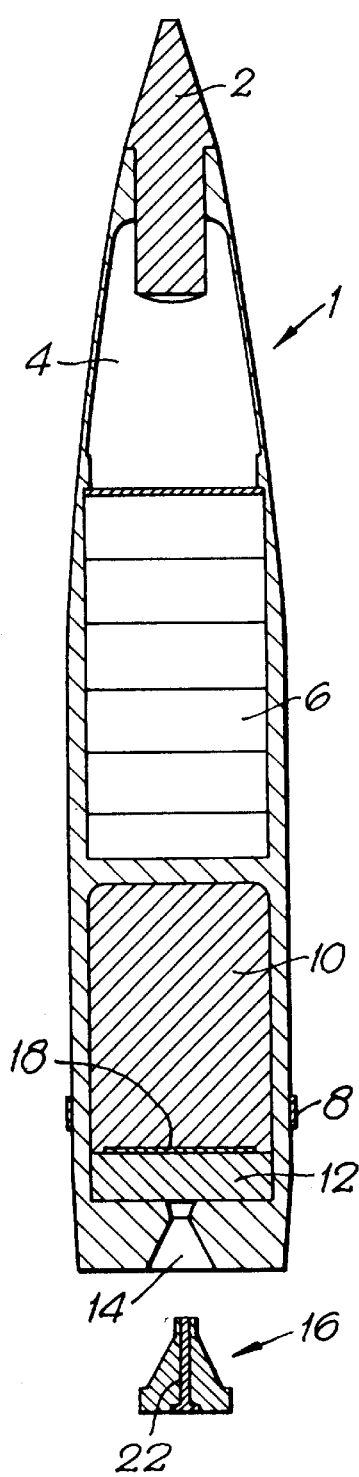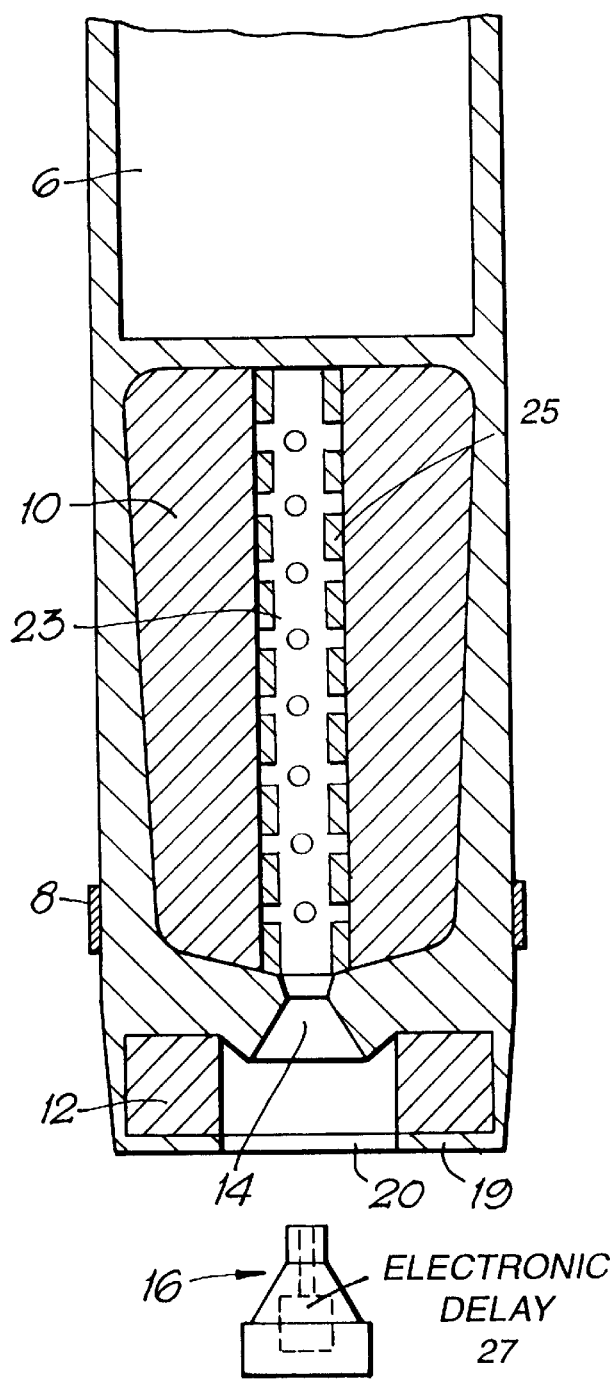

LONG RANGE ARTILLERY SHELL

BACKGROUND OF THE INVENTION

1. Field of the Invention

This invention relates to a long range artillery shell.

2. Discussion of the Prior Art

There is a constant military requirement to extend the range of artillery shells with minimum effect on payload and delivery errors.

In practice this suggests maintaining the general physical shape of current conventional shells. Moreover, it is desirable for the external dimensions and mass of an extended range shell to conform closely to the external dimensions and mass of existing shells, in order that it be launchable from existing ordnance without exceeding the maximum acceptable breech pressure. There are great advantages for a long range shell if these requirements can be achieved.

It is possible to extend the range of shells by incorporating a rocket motor to provide thrust after launch. The trade-off for the incorporation of a rocket motor is the loss of payload corresponding to the volume occupied by the rocket motor. As an example, rocket assistance can extend the range of a 155 mm artillery shell by approximately 23% whilst sacrificing approximately 64% of its payload.

It is possible to extend the range of shells by means of base bleed. Base bleed increases range by reducing the base drag of the shell by increasing its base pressure. This is achieved by the combustion of a propellant which exhausts its gases into the base region of the shell. The advantage of base bleed as a range enhancer is the much smaller volume requirements of the motor for a given range increase. As an example, base bleed can extend the range of a 155 mm artillery shell by approximately 23% whilst sacrificing approximately 18% of its payload.

Neither rocket assistance nor base bleed are capable of achieving the desired ranges with a reasonable payload. The problem is how to increase range further whilst maintaining the overall dimensional constraints of existing shells and providing for a reasonable payload.

SUMMARY OF THE INVENTION

Therefore, it is an object of the present invention to provide an artillery shell having an enhanced extended range capability.

According to the present invention there is provided a long range artillery shell having a rocket motor comprising rocket propellant material and a rocket nozzle, wherein said shell further comprises base bleed propellant material, base bleed ignition means for igniting the base bleed propellant material when the shell is launched and a rocket ignition delay mechanism for delaying ignition of the rocket propellant material until the base bleed propellant material has substantially finished burning.

Base bleed is particularly effective at reducing base drag when the shell is moving at high velocity through the relatively dense air of the troposphere in the initial stages of flight. Rocket assistance, on the other hand, is very effective when the shell enters the less dense air of the stratosphere. The low air density at this high altitude means that the shell's velocity is diminished at a slower rate, due to the reduced drag, resulting in long range and relatively short flight time. The rocket motor is also more effective at high altitude as the velocity increase is maximised in the low density atmosphere.

The combination of base bleed and delayed rocket assistance according to the invention wherein each is utilised in its most effective part of the ballistic trajectory has been found to extend the range of a standard spin stabilised 155 mm artillery shell by 85%–150% whilst sacrificing 15%–45% of the standard payload.

The rocket motor may be of the cigarette burn type. This consists of a single solid grain of propellant which is ignited at the nozzle end and burns back evenly at a constant rate. The advantages of this design are the consistent output characteristic produced and its relative ease of manufacture. However, in order to facilitate reliable and sustained rocket motor ignition a plenum chamber or cavity must be provided.

Whilst the provision of a rear plenum chamber is not a problem in missile systems, since launch accelerations are comparatively low, it poses severe technical problems for gun launched shells which are subjected to launch accelerations over 200 times greater than those for missile systems. The provision of reinforcement at the rear of the rocket propellant, to prevent propellant collapse as a result of the stresses induced during gun launch, decreases the propellant carrying capacity of the rocket motor whilst increasing the cost of manufacture.

One solution to this problem is to house the base bleed propellant material in the same chamber of a fuel container as the rocket propellant material and rearwardly thereof. The advantage of this arrangement is that the base bleed propellant material provides mechanical support to the rocket propellant material during launch. The burning of the base bleed propellant material during the initial stages of flight provides the necessary plenum chamber to facilitate subsequent ignition of the rocket propellant material.

Ignition of the rocket propellant material may be effected by the burning base bleed. However, experience has shown that the base bleed propellant burns faster at the centre than at its edges. This can result in ignition of the rocket propellant before the completion of the base bleed phase. This is inefficient since any base bleed propellant still burning after rocket ignition occurs is ineffective in increasing range. Premature rocket ignition might also occur due to heat transfer from the base bleed gases. Apart from being inefficient, premature ignition, howsoever caused, is highly undesirable as it causes large round to round range inconsistencies.

To mitigate the problem of premature rocket ignition a thermal ignition barrier may be located between the two different propellant materials so that the rocket propellant is thermally insulated from the burning base bleed propellant during the base bleed phase. This can take the form of a thermally insulating insert such as a rubber or composite disc, or a chemical ignition inhibitor layer. Whilst the ignition barrier must provide the required thermal barrier it must not obstruct the nozzle on rocket ignition ie it must disintegrate or combust.

Rocket ignition may be effected at a predetermined time after launch by an electronic delay. The time is preferably determined by computational trajectory modelling in order to maximise range. This provides a high degree of ignition accuracy over a wide temperature range. In this case the ignition barrier preferably extends across the whole interface between the base bleed propellant material and the rocket propellant material, but it must be such that it does not act to isolate the rocket propellant from its essential plenum chamber.

Alternatively, the thermal ignition barrier may not extend across the whole interface between the base bleed propellant material and rocket propellant material in order that the base bleed propellant material is in contact with the rocket propellant material at its peripheral regions. This allows for rocket ignition to be initiated by the burning base bleed material when the base bleed propellant material has substantially finished burning.

In a second embodiment the rocket motor may be of the conduit burn type, in which the plenum chamber is provided by a central cavity extending throughout the length of the rocket propellant material. In such an arrangement the propellant burns from the cavity outwards with little heat being conducted to the rocket walls. The advantage of this being that there is minimal risk of premature ignition of unburnt propellant. The risk of propellant mechanical failure due to the gun launch forces may require the incorporation of support baffles.

It is preferred, in this case, to house the base bleed propellant material in a separate annular unit arranged coaxially with the rocket nozzle, thereby making use of the "wasted" space around the nozzle. The advantage of housing the base bleed in a separate unit is that it allows for the use of an optimal base bleed propellant configuration, thereby maximising base bleed efficiency.

In this case rocket motor ignition may be effected by a pyrotechnic delay through the rocket motor nozzle plug. The pyrotechnic delay is ignited by the hot propelling gases produced at gun launch and is designed to provide the required delay before burning through to the rocket motor igniter and causing rocket ignition.

Alternatively, rocket ignition may be effected by an electronic delay as previously described.

Base bleed ignition can be achieved by any convenient method such as the incorporation of a mass of pyrotechnic material into the rocket motor nozzle plug in such a way that it is ignited by the hot propelling gases during launch and thereafter causes reliable base bleed ignition.

BRIEF DESCRIPTION OF THE DRAWINGS

The invention will now be described by way of example only with reference to the accompanying drawings, in which:

FIG. 1 is a cross sectional view of a long range artillery shell according to a first embodiment of the invention, showing a rocket motor nozzle plug removed from the rocket motor nozzle;

FIG. 2 is a cross sectional view of the rear part of a long range artillery shell according to a second embodiment of the invention, showing a rocket motor nozzle plug removed from the rocket motor nozzle;

DETAILED DESCRIPTION OF THE PREFERRED EMBODIMENTS

Figure 3:
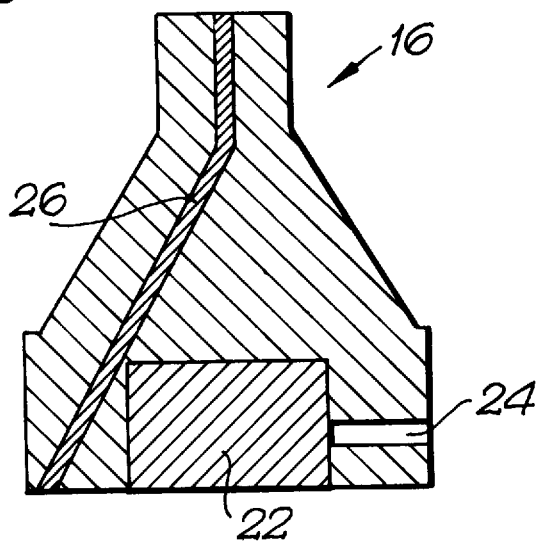
FIG. 3 is a cross sectional view of the rocket motor nozzle plug of FIG. 2.

Referring to FIG. 1 a 155 mm artillery shell 1 comprises a fuze 2, a payload volume 6 shown carrying bomblets, a bomblet expulsion system 4, a driving band 8 and range extension means. The range extension means comprises a rocket motor having rocket propellant material 10 and a rocket motor nozzle 14, in combination with base bleed propellant material 12 housed in the same chamber and behind the rocket propellant material 10. In this configuration the rocket motor nozzle 14 also functions as a base bleed nozzle. A rocket motor nozzle plug 16, shown removed from the rocket motor nozzle 14 for clarity, is provided to seal the rocket motor for purposes of safe handling and long term storage. In this configuration it also provides the base bleed ignition means in the form of a mass of pyrotechnic composition 22, typically a blend of magnesium, PTFE and a copolymer of hexafluoropropylene and vinylidene fluoride, running through the centre of the plug 16. A chemical inhibitor layer 18 is formed at the interface between the two propellant materials 10, 12, leaving an uninhibited annular surface of contact between the two propellant materials 10,12, around the periphery of the rocket/base bleed fuel container.

The critical requirements for the rocket propellant material are that it be suitable for processing and that it have a high specific impulse and reliable mechanical properties over a wide temperature range. For these reasons aluminised rubbery composite hydroxy terminated polybutadiene (HTPB) may be chosen. The chemical inhibitor layer 18 is conveniently a layer of inert rubber binder.

In use the shell is launched from a gun. The hot propelling gases produced in the breech chamber cause the base bleed ignition composition 22 to ignite, which subsequently causes base bleed ignition. The base bleed propellant material 12 will burn at a faster rate in the centre but rocket ignition will not occur until the outer ring of base bleed propellant material burns through because of the presence of the centrally located inhibitor layer 18.

Figure 4:
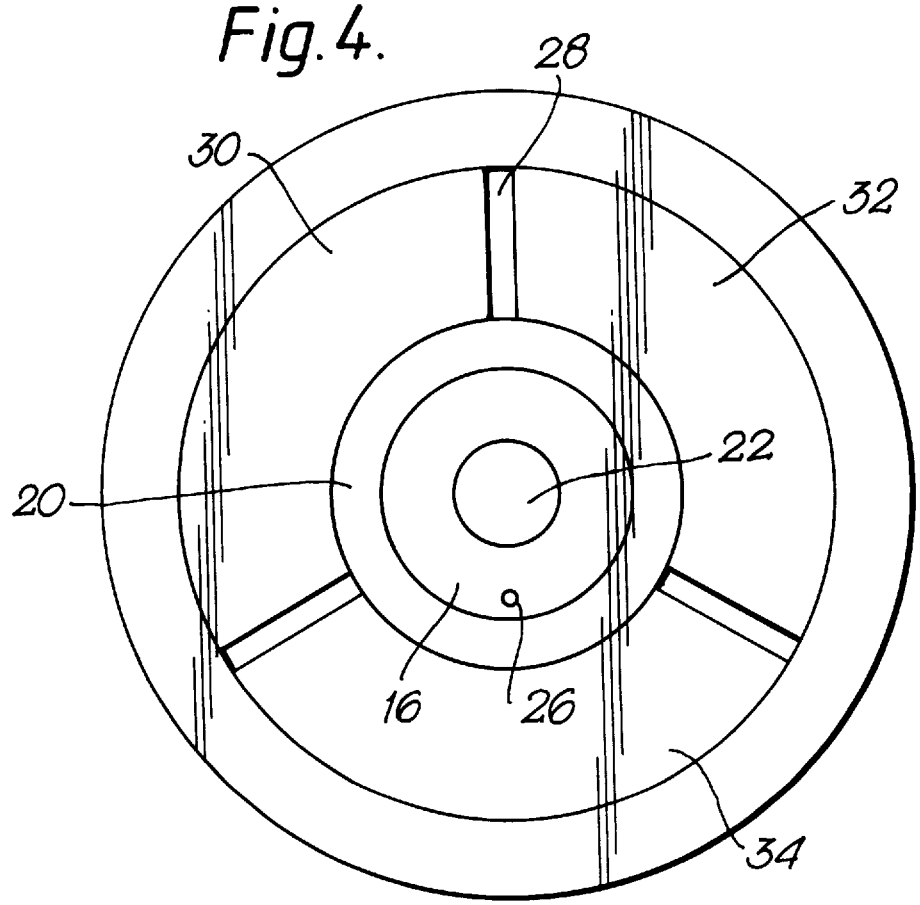
FIG. 4 is a rear view of the shell of FIG. 2 with base plate cut away showing the plug of FIG. 3 in place in the rocket motor nozzle.

Referring to FIGS. 2 to 4 which illustrate a second embodiment of the invention, the rocket propellant material 10 is formed into a conduit having a central cavity 23 extending throughout the length of the rocket propellant material 10 with a support baffle 25 located therein.

The base bleed propellant material 12 is housed separately in an annular unit, having an annular base plate 19 and base bleed nozzle 20.

For best results the base bleed propellant is provided in the form of three grains 30, 32, 34 having a parallel radial gap 28 between each grain and the next.

In this embodiment the rocket motor nozzle plug 16 provides both the base bleed ignition means and the rocket ignition delay mechanism. A mass of base bleed ignition composition 22 has several radial flash holes 24 extending outwards therefrom. In FIG. 3, a pyrotechnic delay 26 extends from the rear surface of the plug 16 towards the rocket motor. In FIG. 4 the base plate 19 has been cut away to show the preferred base bleed propellant configuration.

In use the hot propelling gases produced on launch ignite both the base bleed ignition composition 22 and the pyrotechnic delay 26. The base bleed ignition is sustained by the igniter by the flash transfer through the flash holes 24 in the plug 16. The pyrotechnic delay 26, on the other hand, is designed to burn for a longer predetermined time, so that rocket ignition occurs when the base bleed has substantially finished burning.

A typical 155 mm artillery shell according to the invention, with a mass of 43.5 kgs and a muzzle velocity of approximately 950 m/s could achieve ranges in excess of 55 km with a payload volume approximately 50% that of a conventional shell.

Such a large increase in range could not have been achieved with base bleed or rocket assistance alone. The increase in range is due to the combination and optimisation of base bleed and delayed rocket assistance each utilised in its most effective part of the ballistic trajectory.

We claim:

1. A long range artillery shell having a rocket motor comprising rocket propellant material and a rocket nozzle, wherein said shell further comprises base bleed propellant material, base bleed ignition means for igniting the base bleed propellant material when the shell is launched and a rocket ignition delay mechanism for delaying ignition of the rocket propellant material until the base bleed propellant material has substantially finished burning.

2. A long range artillery shell as claimed in claim 1 wherein the rocket propellant material comprises a single solid grain of propellant.

3. A long range artillery shell as claimed in claim 1 wherein a fuel container defines a single chamber in which the base bleed propellant material is housed rearwardly of the rocket propellant material.

4. A long range artillery shell as claimed in claim 1 wherein the base bleed propellant material is housed in an annular unit, arranged coaxially with the rocket nozzle.

5. A long range artillery shell as claimed in claim 1 wherein the rocket ignition delay mechanism comprises an electronic delay.

6. A long range artillery shell as claimed in claims 1 wherein the rocket ignition delay mechanism comprises a pyrotechnic delay.

7. A long range artillery shell as claimed in claim 1 wherein the base bleed ignition means comprises a mass of pyrotechnic material.

8. A long range artillery shell as claimed in claim 1 wherein the rocket propellant material defines a central cavity extending throughout its length.

9. A long range artillery shell as claimed in claim 8 wherein support baffles are provided in the cavity.

10. A long range artillery shell having a rocket motor comprising rocket propellant material and a rocket nozzle, wherein said shell further comprises base bleed propellant material, base bleed ignition means for igniting the base bleed propellant material when the shell is launched and a rocket ignition delay mechanism for delaying ignition of the rocket propellant material until the base bleed propellant material has substantially finished burning, wherein the base bleed propellant material is housed in an annular unit, arranged coaxially with the rocket nozzle.

11. A long range artillery shell as claimed in claim 10, wherein the rocket propellant material comprises a single solid grain of propellant.

12. A long range artillery shell as claimed in claim 10, wherein a fuel container defines a single chamber in which the base bleed propellant material is housed rearwardly of the rocket propellant material.

13. A long range artillery shell as claimed in claim 10, wherein the rocket ignition delay mechanism comprises an electronic delay.

14. A long range artillery shell as claimed in claim 10, wherein the rocket ignition delay mechanism comprises a pyrotechnic delay.

15. A long range artillery shell as claimed in claim 10, wherein the base bleed ignition means comprises a mass of pyrotechnic material.

16. A long range artillery shell as claimed in claim 10, wherein the rocket propellant material defines a central cavity extending throughout its length.

17. A long range artillery shell as claimed in claim 16, wherein support baffles are provided in said cavity.

* * * * *